United States Patent
Allen et al.

[11] Patent Number: 6,146,089
[45] Date of Patent: Nov. 14, 2000

[54] FAN CONTAINMENT STRUCTURE HAVING CONTOURED SHROUD FOR OPTIMIZED TIP CLEARANCE

[75] Inventors: Jeffrey S. Allen, Batavia; Andrew Breeze-Stringfellow, Montgomery; Gary B. Manharth, Milford, all of Ohio

[73] Assignee: General Electric Company, Cincinnati, Ohio

[21] Appl. No.: 09/217,106

[22] Filed: Dec. 21, 1998

Related U.S. Application Data

[60] Provisional application No. 60/109,554, Nov. 23, 1998.

[51] Int. Cl.$^7$ ..................................................... F01D 21/00
[52] U.S. Cl. ........................ 415/9; 415/173.4; 415/174.4; 415/197
[58] Field of Search ........................ 415/9, 173.4, 173.5, 415/174.4, 174.5, 200, 230, 196, 197

[56] References Cited

U.S. PATENT DOCUMENTS

| | | | |
|---|---|---|---|
| 4,534,698 | 8/1985 | Tomich | 415/9 |
| 5,160,248 | 11/1992 | Clarke | 415/9 |
| 5,259,724 | 11/1993 | Liston et al. | 415/9 |
| 5,267,828 | 12/1993 | Lenhart et al. | 415/9 |
| 5,344,280 | 9/1994 | Langenbrunner et al. | 415/9 |
| 5,388,959 | 2/1995 | Forrester et al. | 415/173.4 |
| 5,474,417 | 12/1995 | Privett et al. | 415/58.5 |
| 5,482,429 | 1/1996 | Penda | 415/9 |
| 5,683,789 | 11/1997 | Langenbrunner et al. | 428/209 |
| 5,791,871 | 8/1998 | Sech et al. | 415/173.1 |

*Primary Examiner*—Edward K. Look
*Assistant Examiner*—Ninh Nguyen
*Attorney, Agent, or Firm*—Andrew C. Hess; Nathan D. Herkamp

[57] ABSTRACT

An abradable fan containment structure within a fan section of a turbofan engine is provided. The fan section of the turbofan engine has fan blades and an abradable fan shroud. The abradable fan shroud includes an inner fan casing circumscribing the fan blades such that the inner annular surface of the fan shroud is disposed adjacent the blade tips of the fan blades within the fan section. The inner annular surface is formed from an abradable material. The abradable material contour is substantially triangular along the axial length from the leading edge to the trailing edge. The abradable material has a contoured surface characterized by a trapezoidal shape after being worn when rubbed by the tips of the fan blades during operation of the engine.

9 Claims, 9 Drawing Sheets

FAN CONTAINMENT STRUCTURE HAVING CONTOURED SHROUD FOR OPTIMIZED TIP CLEARANCE

This application claims the benefit of U.S. Provisional Patent Application, Ser. No. 60/109,554, filed on Nov. 23, 1998.

FIELD OF THE INVENTION

The present invention relates to abradable shroud assemblies for use in turbomachinery, such as gas turbine engines. More particularly, this invention relates to an improved fan casing for a turbofan engine having a shroud, in which an optimized clearance between the fan shroud and the fan blades is achieved.

BACKGROUND OF THE INVENTION

Gas turbine engines generally operate on the principle of compressing air within a compressor section of the engine, and then delivering the compressed air to the combustion section of the engine where fuel is added to the air and this mixture of air and fuel is then ignited. Afterwards, the resulting combustion gases are delivered to the turbine section of the engine, where a portion of the energy generated by the combustion process is extracted by a turbine rotor to drive the turbine engine's compressor rotor.

High bypass turbofan engines are widely used in large aircraft such as those used by commercial airlines. These aircraft typically operate at subsonic speeds. High bypass turbofan engines have a relatively large fan at the front of the engine which serves to produce greater thrust and to reduce specific fuel consumption (hereinafter, SFC). The SFC for an aircraft engine is critical to the airline customer and optimization of SFC is desired in order to reduce airline operating costs. During engine operation, the fan serves to compress incoming air. A portion of this incoming air is then delivered to the combustion section through the compressor section while a larger portion of the air bypasses the compressor section. This bypass air is delivered to the rear of the engine and is used to generate most of the thrust.

In most turbofan engines the fan is contained by a fan case that is equipped with a shroud. The shroud circumscribes the fan and is adjacent to the tips of the fan blades. The shroud serves to channel incoming air through the fan so as to ensure that most of the air entering the engine will be compressed by the fan. A small portion of the air is able to bypass the fan blades through a radial gap present between the tips of the fan blades and the shroud. Because the air compressed by the fan blades is used to generate thrust and supply the turbine section of the engine, SFC can be significantly effected by limiting the amount of air which is able to bypass the fan blades through this gap. Improving SFC can positively impact the airline customer and promote future sales of aircraft engines.

During the normal operation of an aircraft turbofan engine, the fan blades may rub the shroud. Any rubbing contact between the tips of the fan blades and the shroud will tend to increase the gap between the shroud and the tips of the fan blades, thereby reducing engine efficiency. Typically, the portion of the shroud adjacent to the blade tips is covered with an abradable material. This abradable material will sacrificially abrade away when rubbed by the tips of the fan blades. As the abradable material is rubbed by the tips of the fan blades, abradable material is removed and the gap or clearance between the blade tips and the surface of the abradable material will increase. In order to maintain desirable aerodynamic efficiencies associated with a small gap between the surface of the abradable material and the fan blades, most shrouds have a surface contour that matches the contour of the tip of the fan blades.

This gap has typically been achieved by reducing variation in the length of the fan blades, radial location of the fan disk, or variation in the fan case diameter. Existing fan designs also attempt to tighten the gap without allowing any significant rubbing between the fan blades and the abradable material in the fan case. Accordingly, the fan and shroud are manufactured to assure close tolerances in order to minimize this gap. Typically during manufacture the surface of the abradable material is ground or machined to the same straight contour as the fan blade. When the blade rubs the abradable material during operation, steps in the surface of the abradable material are created at both the location adjacent to the leading edge of the fan blade and at the location adjacent to the trailing edge of the fan blade. These steps in the surface of the abradable material cause a disruption in the airflow that can lead to actual losses in performance. Historically, if this rub or these steps extend 360 degrees or all the way around the fan case, the clearance has been considered satisfactory without giving any consideration to the axial location of the rub or step relative to the tip of the fan blade.

Consequently, it would be advantageous to provide a shroud with an abradable material surface that takes into account the rubbing of the fan blades during operation in order to achieve an optimized clearance. It would also be beneficial to provide a method for obtaining such a shroud having an optimized abradable material surface contour.

SUMMARY OF THE INVENTION

In one embodiment of the present invention, an abradable fan containment structure within a fan section of a turbofan engine is provided. The fan section of the turbofan engine has fan blades and an abradable fan shroud. The abradable fan shroud comprises an inner fan casing circumscribing the fan blades and having an inner annular surface disposed adjacent the blade tips of the fan blades. The inner fan casing includes an abradable material. The inner annular surface is substantially triangular along the axial length from the leading edge to the trailing edge. The abradable material is bonded to the inner fan casing by an adhesive layer. The inner annular surface of the abradable material has a contour that has at least two different linear slopes in opposite directions between the leading edge and the trailing edge.

BRIEF DESCRIPTION OF THE DRAWINGS

While the specification concludes with claims particularly pointing out and distinctively claiming the present invention, it is believed that the present invention will be better understood from the following description in conjunction with the accompanying drawings in which like reference numerals identify identical elements and wherein:

DETAILED DESCRIPTION OF THE INVENTION

Figure 1:
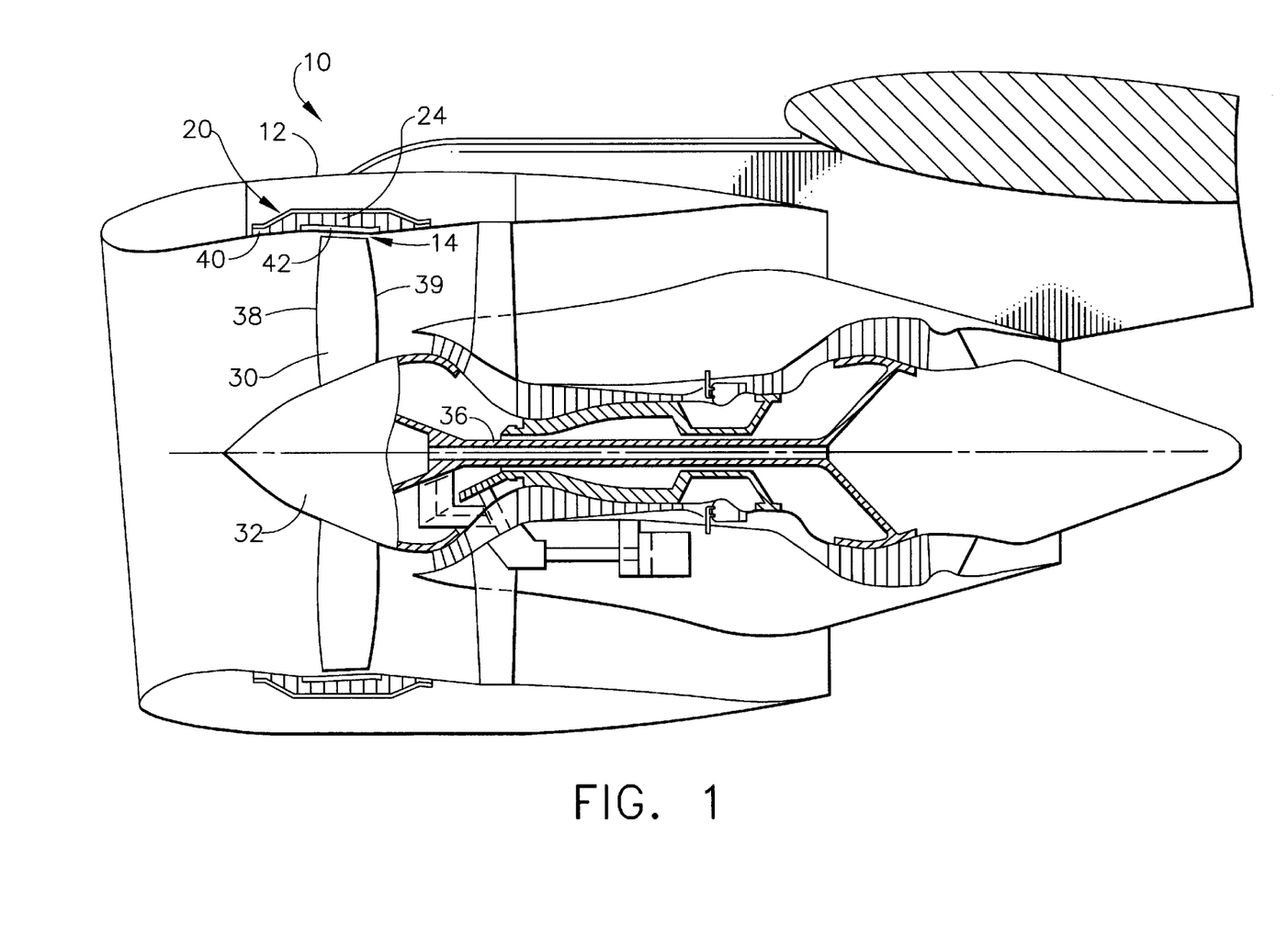
FIG. 1 is a cross sectional view of a turbofan engine.

The present invention provides an abradable fan containment structure 20 for use in turbomachinery, such as a high bypass turbofan engine 10 shown in FIG. 1. In the typical configuration shown, the engine 10 includes a fan section 12 formed by a fan case 24 and a number of fan blades 30 mounted to a fan disk 32 which is located within the fan section 12 of the engine 10. Fan blades 30 are attached to fan disk 32 that is attached to fan rotor 36.

Circumscribing the fan blades 30 is a fan containment structure 20. The inner fan casing 40 of the fan containment structure 20 forms an inner annular groove 42 which supports an abradable fan shroud 44, as shown in greater detail in FIG. 2. Fan containment structure 20 includes a forward fan case 24 having an inner fan casing 40 made usually of aluminum, surrounded by an aluminum honeycomb surrounded by a graphite epoxy outer fan casing 26 surrounded by a kevlar cover 28. The inner fan casing 40 includes an inner annular groove 42 to which the annular abradable fan shroud 44 is attached. Fan shroud 44 includes abradable material 46 having an inner annular surface 48 against which is juxtaposed blade tips 34 of fan blades 30 of fan section 12. The fan shroud 44 serves to channel the incoming air through the fan 12 so as to ensure that the fan 12 will compress the bulk of the air entering the engine 10.

Figure 2:
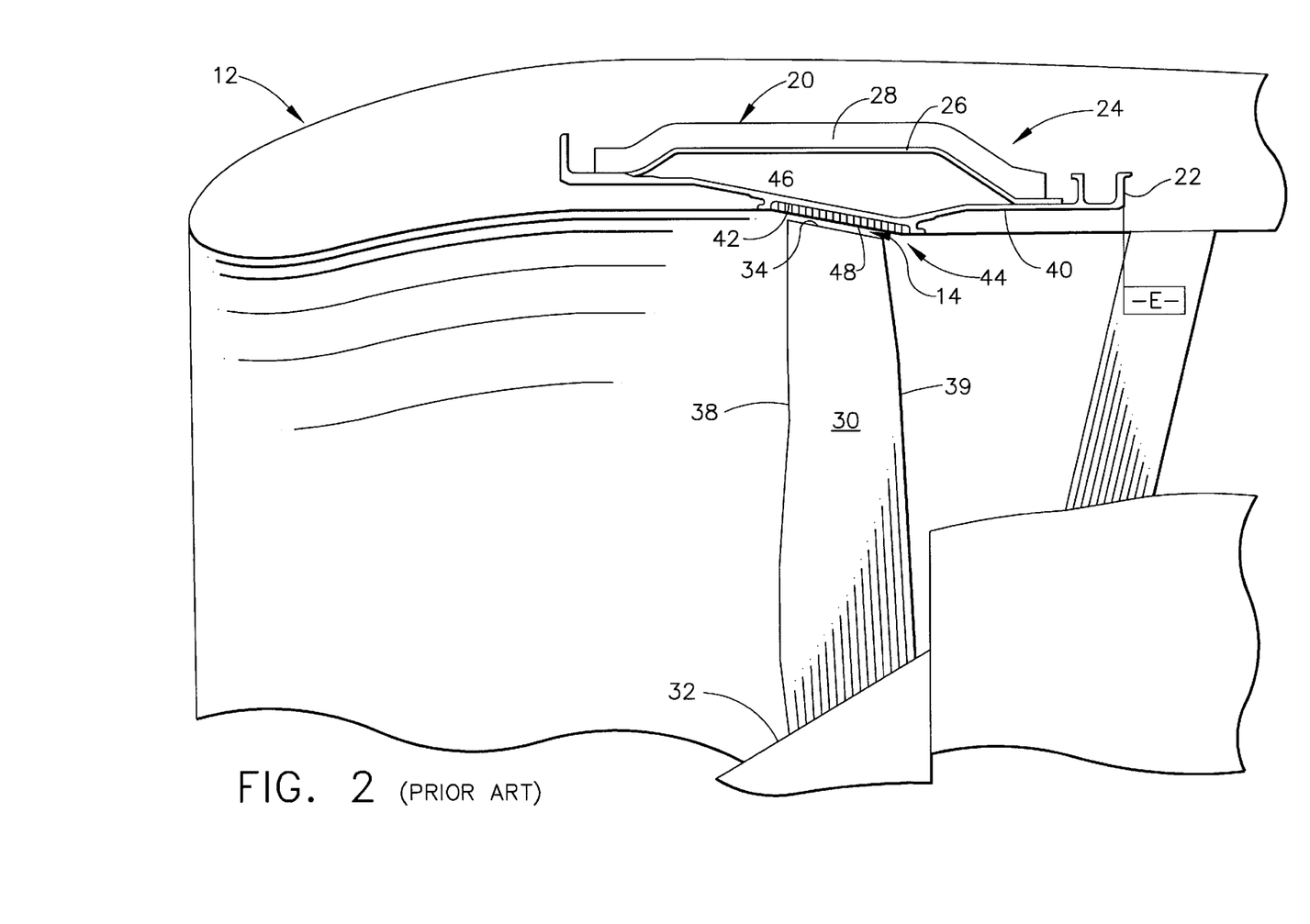
FIG. 2 is an enlarged partial view of the fan section of the turbofan engine of FIG. 1.

Abradable material 46 is present on the shroud 44 immediately adjacent the tips 34 of the fan blades 30. Preferably, a small radial gap 14 is present between the tips 34 of the fan blades 30 and the abradable material 46. It is this gap or clearance 14 that is minimized in order to promote the efficiency of the engine 10. Also shown in FIG. 2 is the aft flange 22 of the forward fan case 24. The contour positions on the inner annular surface 48 are measured by an axial length B relative to this location that is referred to in FIG. 2 and FIG. 3 as datum E.

Figure 3:
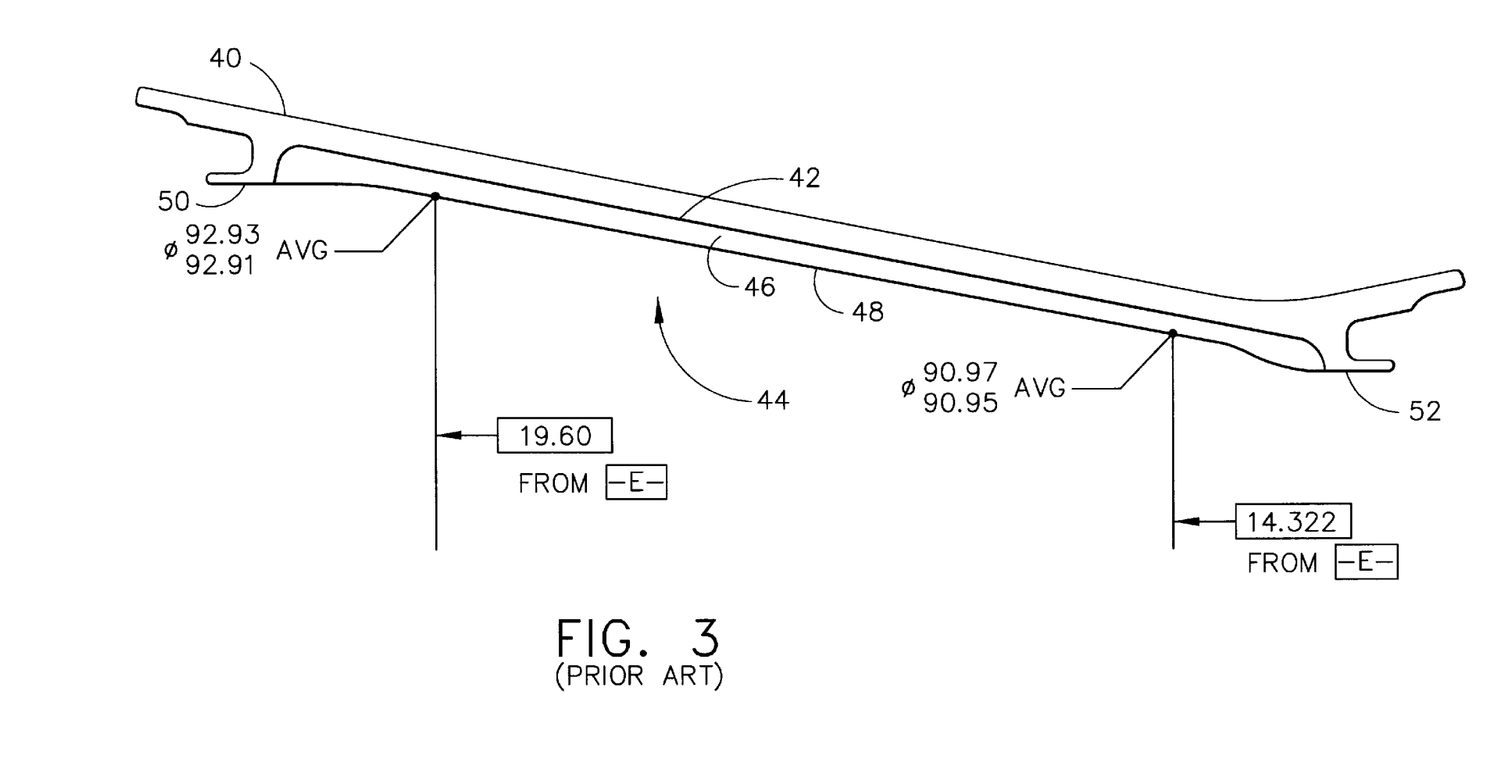
FIG. 3 is a cross sectional view of a prior art abradable surface contour.

A typical abradable fan shroud 44, as shown in FIG. 3, comprises an abradable material 46 of epoxy with phenolic microballoons disposed in and supported by an annular plastic honeycomb structure, bonded by adhesive to an annular layer of fiberglass, bonded by adhesive to the metal inner annular groove 42 on the inner fan casing 40. However, the abradable material 46 may be any suitable light weight material of the type known and used in the prior art, including composite materials, or the like. The abradable material 46 is preferably provided in the form of one or more solid panels though it can be formed from a loose material. A more detailed description of the features and components of such a conventional fan shroud 44 including an abradable material 46 can be found in, for example, U.S. Pat. No. 5,388,959 issued Feb. 14, 1995 to Forrester et al. and U.S. Pat. No. 5,683,789 issued Nov. 4, 1997 to Langenbrunner et al., both of which are assigned to the General Electric Company, and both which are hereby incorporated herein by reference.

Figure 4:
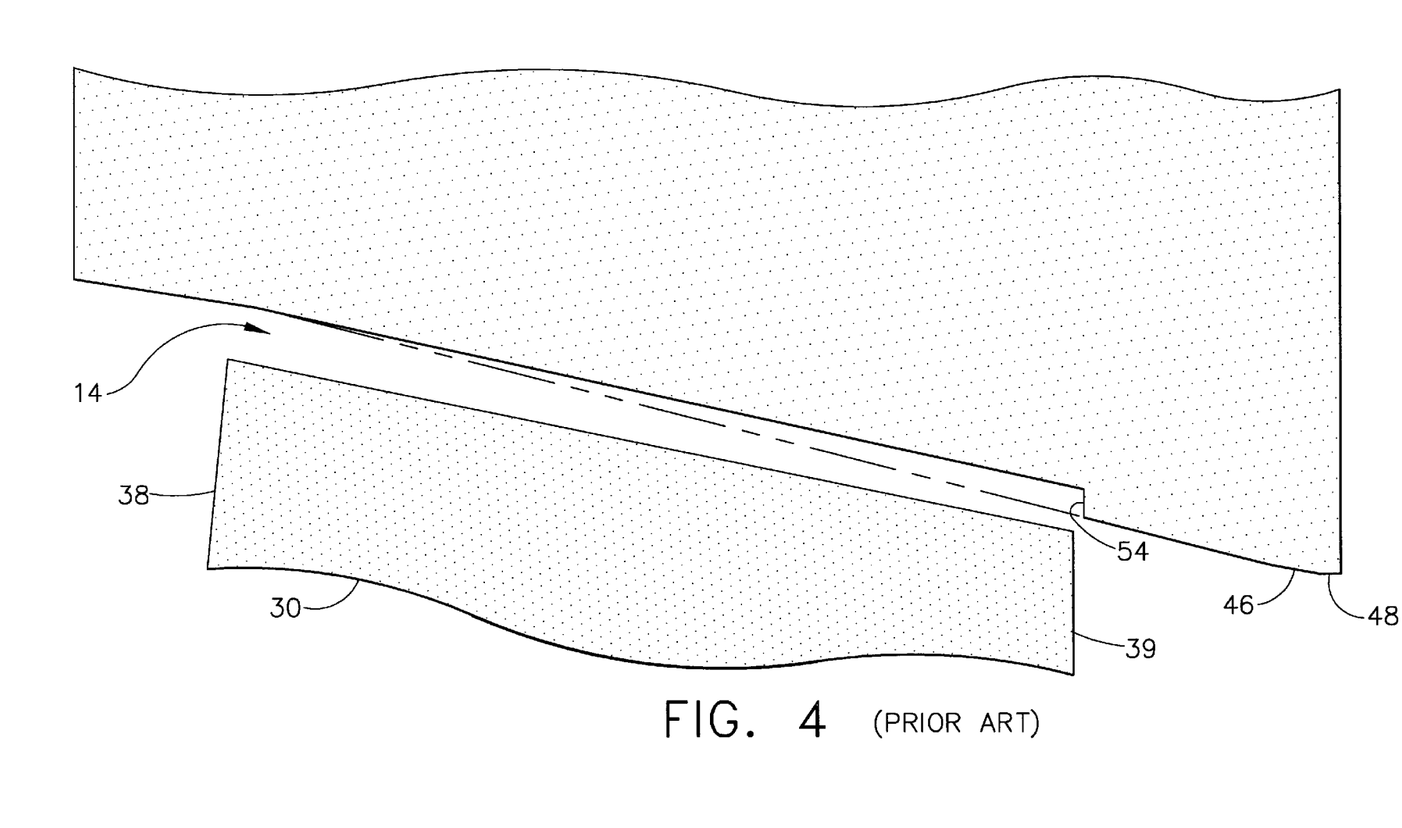
FIG. 4 is a cross sectional view of a prior art abradable shroud profile after initial operation.

In order to achieve desirable aerodynamic efficiencies associated with maintaining a small gap 14 between the inner annular surface 48 of the abradable material 46 and the fan blades 30, most fan shrouds 44 have an inner annular surface 48 with a contour that matches the contour of the tip 34 of the fan blades 30. Existing fan section designs have attempted to maintain this small gap 14 by only taking into consideration flat or linear surfaces. Typically, fan shrouds 44 are manufactured to assure close tolerances in order to minimize this gap 14. For example, as shown in FIG. 2, the surface of the abradable material 46 in prior art fan shrouds is ground or machined to the same straight contour as the tip 34 of the fan blade 30. Typically, as shown in FIG. 3, this is a straight linear taper from about the forward edge 50 to about the aft edge 52 of the inner fan casing 40. The fan shroud 44 has a larger inside diameter A near the forward edge 50 of the fan shroud 44 and a smaller inside diameter A near the aft edge 52, or vice versa. During operation, when the fan blade 30 rubs the abradable material 46 in such a prior art configuration, as shown in FIG. 4, steps 54 are worn into or formed in the surface of the abradable material 46. Such steps 54 may be created adjacent to the leading edges 38 of the fan blades 30 as well as the location adjacent to the trailing edges 39 of the fan blades 30 all the way around the fan case 24. These steps 54 in the surface of the abradable material 46 cause a disruption in the airflow that can lead to actual loses in performance.

Figure 5:
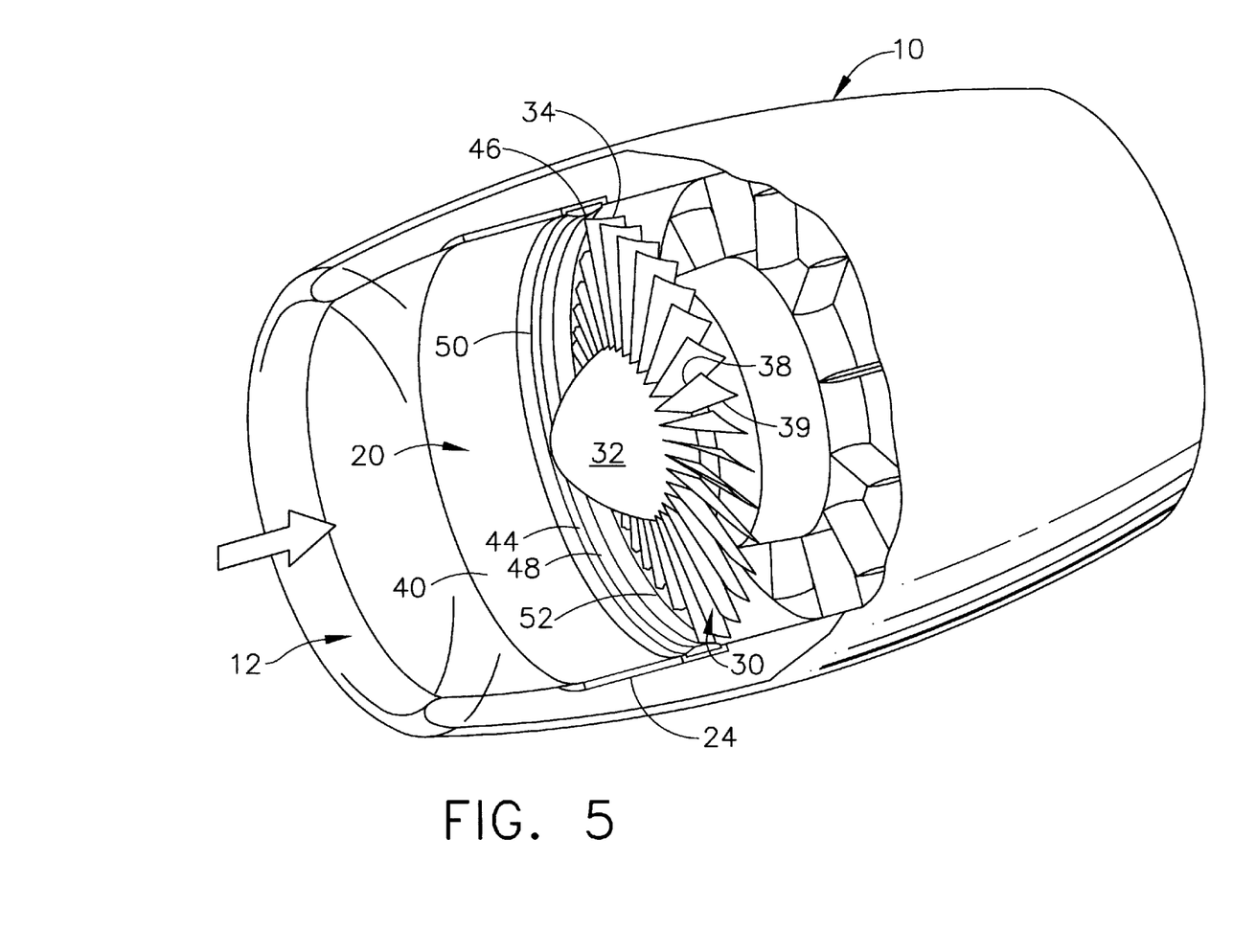
FIG. 5 is a cut away perspective view of a turbofan engine showing the contoured surface of the fan shroud.

Referring now to FIG. 5, a cut away perspective view of the engine 10 shows that the fan shroud 44, with the inner annular surface 48 of the present invention, is a portion of the inner fan casing 40 of the forward fan case 24. The forward fan case 24 can be attached to an aft fan case (not shown) and both are a part of the fan section 12 of the engine 10. These fan cases are typically annular in configuration.

Figure 6:
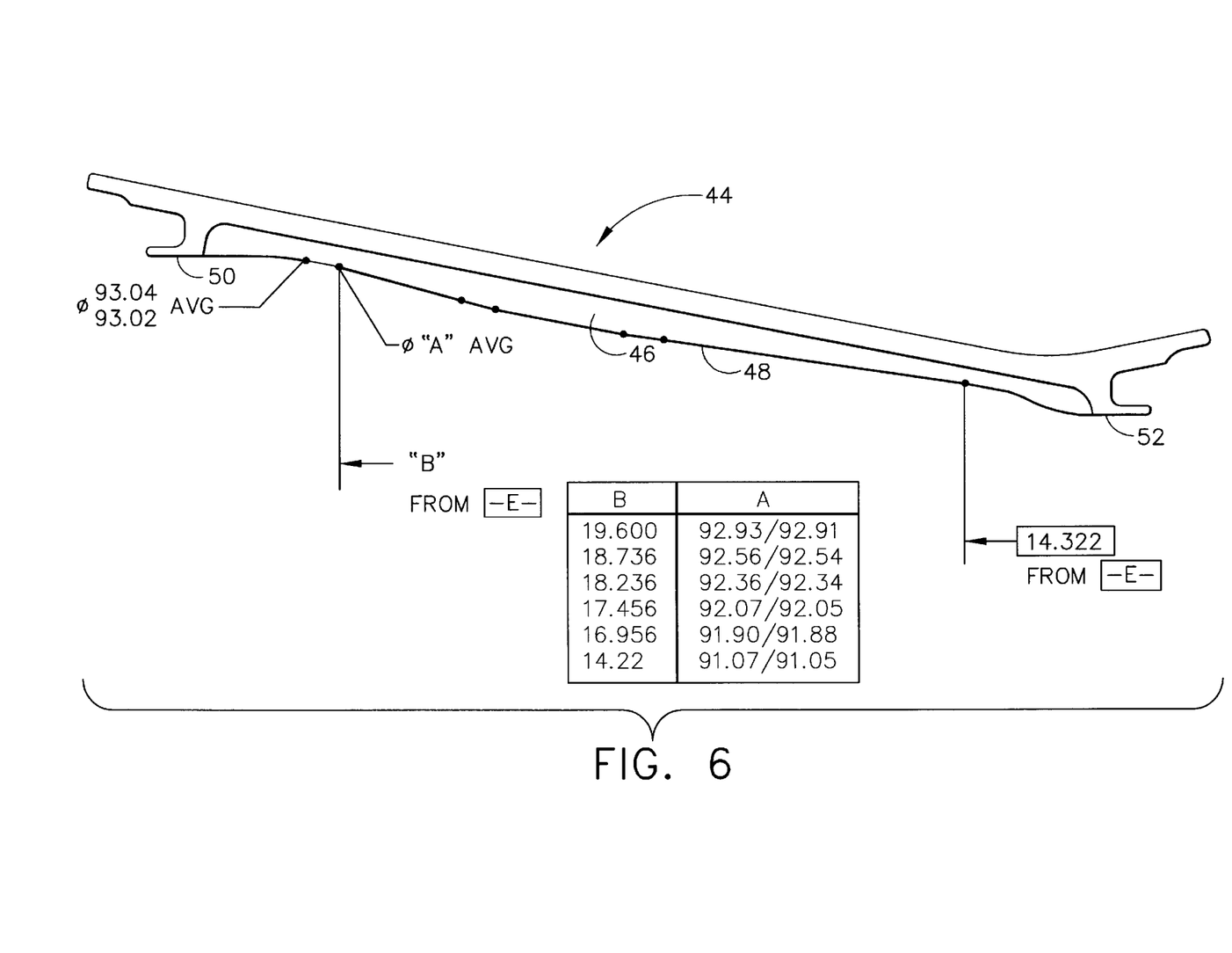
FIG. 6 is a cross sectional view of the abradable surface contour of the present invention.

With modern machines and grinding equipment, the inner annular surface 48 of the abradable material 46 can be ground or machined to virtually any contour. By creating a triangular or trapezoidal contour, as seen in FIG. 5, instead of the straight contour of FIG. 3, the gap 14 created by the fan blades 30 rubbing into the abradable material 46 can be optimized. In particular, as shown in FIG. 6, this type of a grind leaves the diameter A, at the inner annular surface 48 of the fan shroud 44 adjacent to the leading edge 38 of the fan blade 30, the same as with a typical fan shroud, but brings the diameter A inward therefrom to about the one-third axial location B, and then the inner annular surface 48 is contoured back outward to about the two-thirds axial location B. This contour is then continued outward to about the final position adjacent to the trailing edge 39 of the fan blade 30. This configuration optimizes the rub so that maximum performance is achieved and it also eliminates the steps 54 adjacent to the leading edge 38 and trailing edge 39 to reduce airflow disruption. The cost of implementation of this configuration is negligible due to the simple reprogramming of the grinding equipment and cutting machinery.

The uniqueness of the geometry allows the depths of the rubs to be determined by measurements taken axially across the length of the fan shroud 44 in the fan case 24 instead of actually measuring the depth, since the triangle contour has a much more significant width than height. This helps to simplify the rub measurements taken during service or maintenance in the field. Preferably, every one-inch of axial rub width equates to about 0.015 inches of rub depth into the abradable material 46. Prior methods required measuring the depth of the rub only at the step 54 in the surface 48 of the abradable material 46. In a high bypass turbofan engine 10 having a takeoff thrust range of between about 52,000 lb. to 62,000 lb., forward-facing steps 54 can have a SFC margin loss of about 0.016% per 10 mils of step depth for 360 degree rubs. In such an engine 10, an open clearance 14 for the leading two-thirds of blade chord length can have a SFC margin loss of about 0.063% per 10 mils of clearance for 360 degree rubs while the aft one-third of blade chord length has a substantially smaller derivative approximation.

Figure 7:
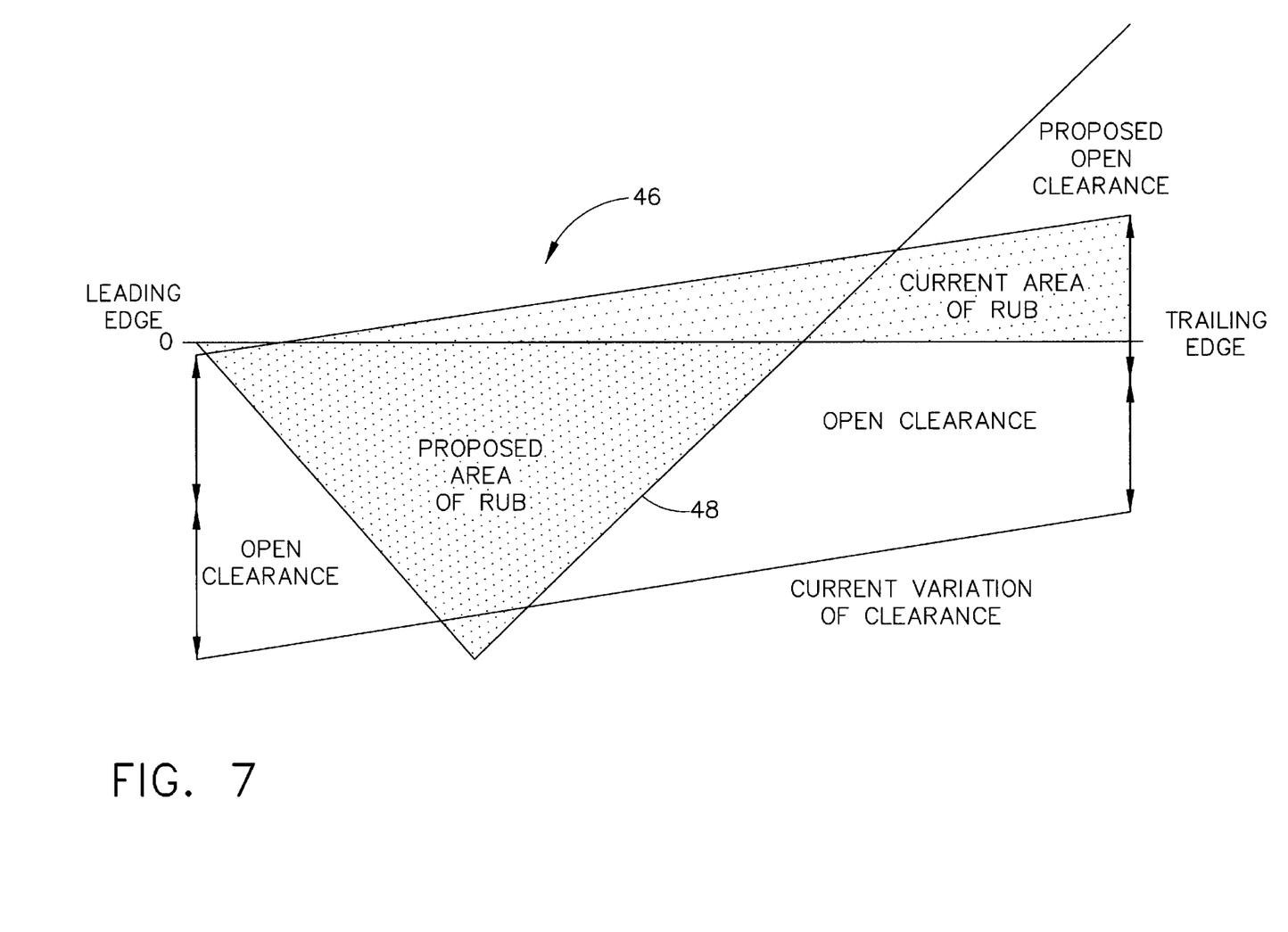
FIG. 7 is a graphic depiction of the abradable surface contour of the present invention, drawn to an exaggerated scale.

A trial of the present invention was performed on a high bypass turbofan engine 10 and is represented graphically in FIG. 7. This trial closed or tightened the clearance or gap 14 to about 0.05 inches at the one-third axial location on the surface 48 of the abradable material 46, opened the gap 14 back up at the two-third point (the original diameter at this point), and opened the gap 14 about 0.05 inches at the trailing edge 39 where the fan blade 30 would rub. Due to assembly difficulty, the apex of the triangle configuration can be cut off by about 0.02 inches, forming a more trapezoidal contour, since this abradable material 46 was being removed anyway during initial engine operation. This trial concluded in 360 degrees of rub with no airflow disruption steps 54. The rub depth was easily estimated by gauging with a ruler across the axial distance of the abradable surface 48 instead of using a drop micrometer to measure the radial distance into the depth to the abradable material 46. The geometry of this configuration equates the rub depth to about 0.015 inches of depth into the abradable material 46 for every 1 inch of axial rub width across the abradable surface 48. The results visually showed about 1 to 3 inches of rub width, which equates or translates to about 0.015 to 0.045 inches of rub depth into the abradable material 46 around the fan case 24.

Rub depth can be thought of as reducing the thickness of the fan shroud 44 since the abradable material 46 thickness is reduced and the inner annular surface 48 of the abradable material 46 is further away from the blade tip 34. This configuration increases the overall inner diameter A of the annular fan shroud 44 at the particular axial location B of the rub. Consequently, the abradable material 46 in the fan shroud 44 has a contoured inner annular surface 48.

Figure 8:
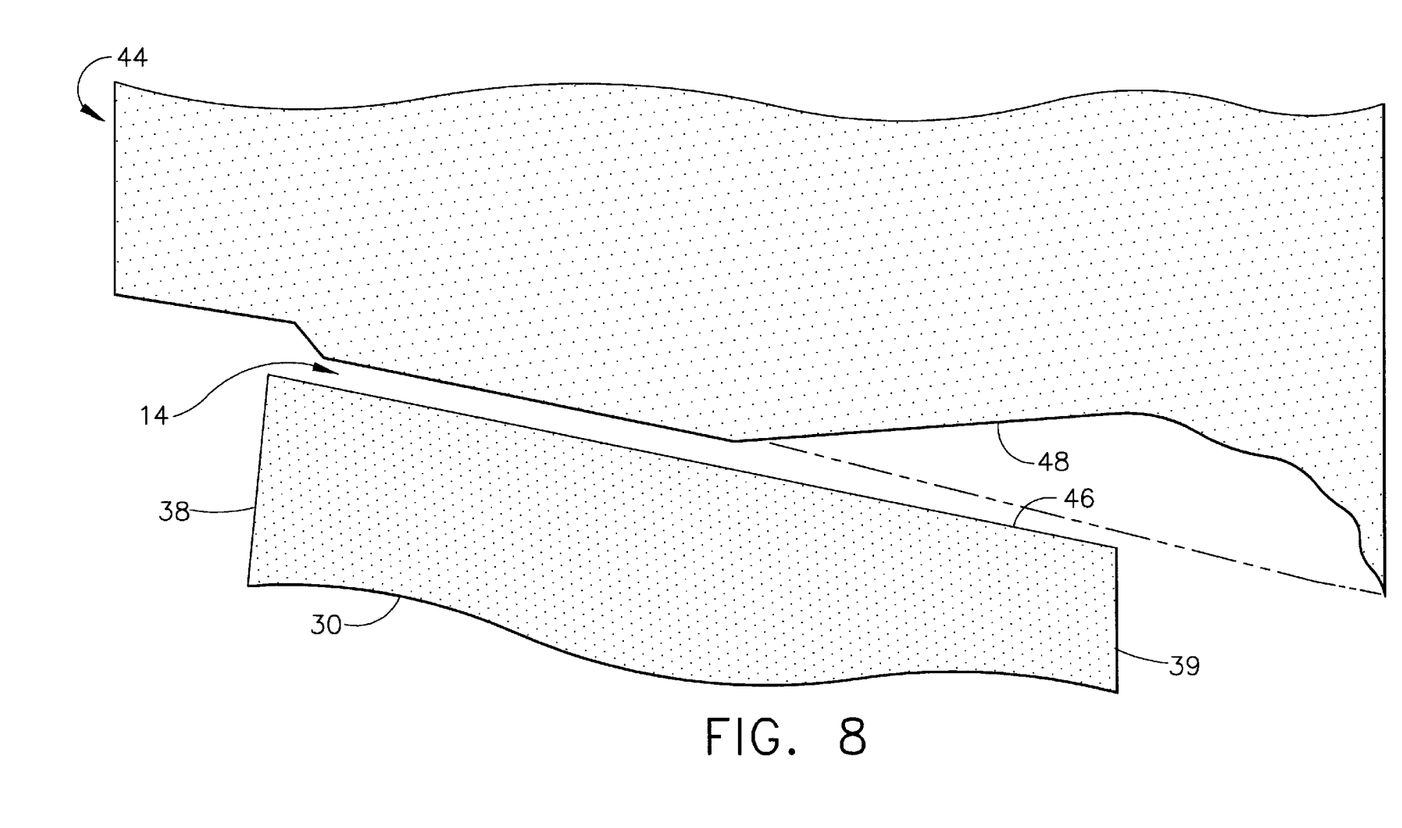
FIG. 8 is a cross sectional view of the abradable shroud profile of the present invention after initial operation.
Figure 9:
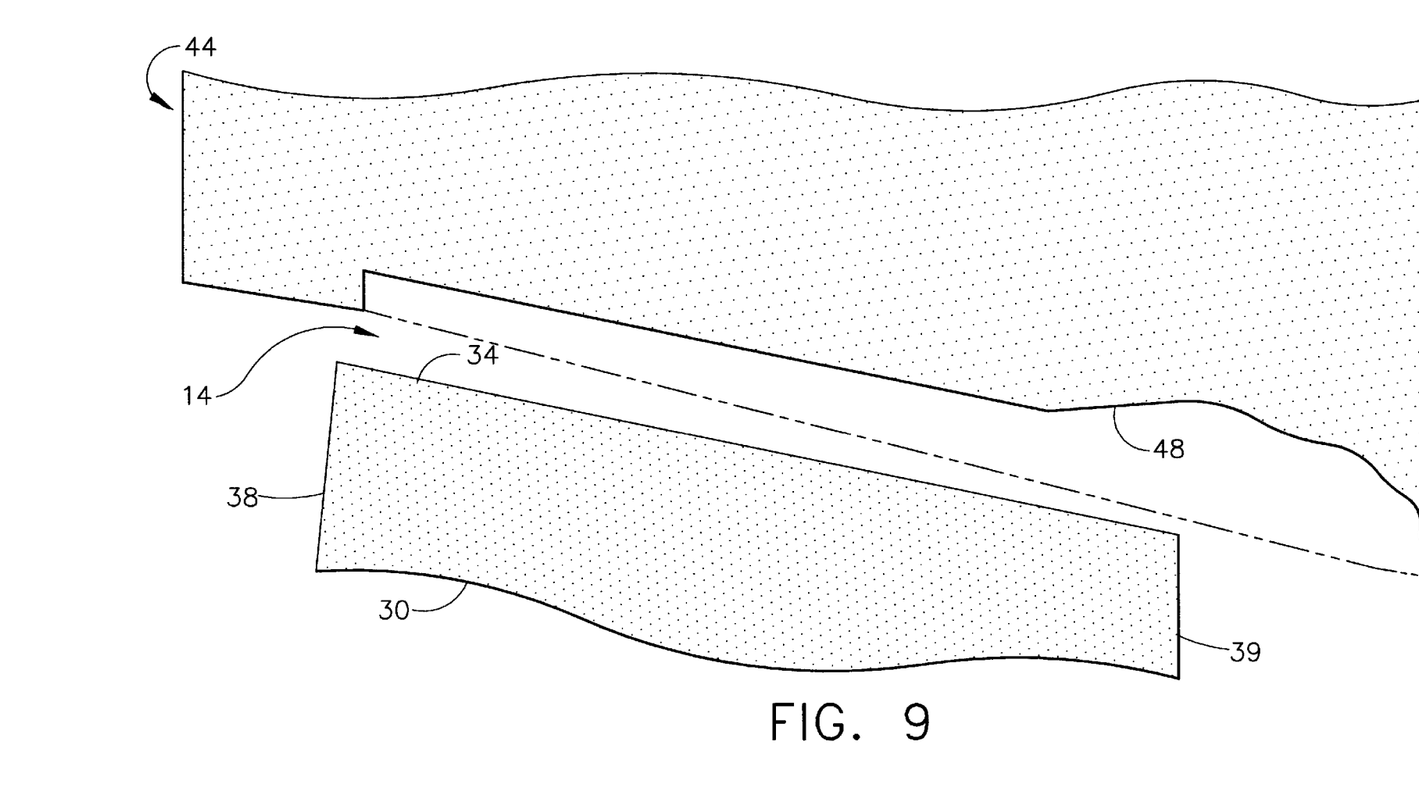
FIG. 9 is a cross sectional view of the abradable shroud profile of the present invention after in service operation.

Viewing a cross-section of the fan shroud 44, as shown in FIG. 8 and FIG. 9, the inner annular surface 48 is shown as being triangulated or somewhat triangular in contour. This triangular configuration indicates that the inner annular surface 48 is tapered and has an inner diameter A that varies along the axial length B of the fan shroud 44. Triangular can also be substantially trapezoidal in shape wherein the inner diameter A at a particular axial position is substantially constant for a certain axial length B that is less than the overall width of the fan shroud 44 and the surface 48 has a contour having a different slope for a given axial length B on either side of this particular axial position. Preferably, the contour of the surface 48 has at least two different linear slopes in opposite directions between the positions adjacent to the leading edge 38 and the trailing edge 39 along the axial length B of the fan shroud 44. In particular, referring back to FIG. 6, the inner diameter is represented by "A" and the axial length is represented by "B."

By changing the machined shape of the inner annular surface 48 of the fan shroud 44 abradable material 46 in the forward fan case 24, the clearance 14 can be closed at the leading edge 38 to assure a 360 degree rub and opened at the trailing edge 39 to prevent an abrupt step 54 when in service field rubs occur. These locations depict axial locations along the shroud 44 based on an adjacent fan blade 30 chord length. Studies have shown that, for one particular transonic compressor rotor at its design speed, stall margin is not sensitive to the tip clearance 14 over the trailing half of the blade 30, but is very sensitive to the tip clearance 14 over the leading half of the blade chord. Consequently, stall margin is decreased with increased clearance 14 between the blade tip 34 and inner annular surface 48. Since the preferred embodiment of the present invention does not increase the tip clearance 14 over the forward two-thirds of the blade chord length, fan stall margin is not predicted to be adversely impacted. Additionally, fan tip clearance 14 has been determined to have no discernible effect on the onset or magnitude of fan blade flutter. Consequently, the fan shroud 44 of the present invention will not have an adverse effect on fan blade flutter. Since the performance of a high bypass turbofan engine 10, having a takeoff thrust range of between about 52,000 lb. to 62,000 lb., can be improved by about 0.05% SFC at sea level cruise, the actual SFC improvement in such an engine 10 is expected to be between about 0.038% to 0.098%.

The present invention will modify the fan case 24 abradable material 46 grind in order to optimize the clearance 14 between the fan blades 30 and the fan shroud 44. In particular there will be an elimination of any forward facing step 54 in the abradable material 46 at the trailing edge 39 of the fan blade 30 during operation. This configuration produces about 360 degrees of rub on the fan shroud 44, at least at the inner most point of the fan shroud 44. This abradable fan shroud 44 includes a contour that is triangular in shape so that the surface 48 provides the tightest clearance 14 at about one-third the distance of the blade chord aft from the leading edge 38.

Although particular versions and embodiments of the present invention have been shown and described, various modifications can be made to this fan containment structure 20 without departing from the teachings of the present invention. The terms used in describing the invention are used in their descriptive sense and not as terms of limitation, it being intended that all equivalents thereof be included within the scope of the appended claims.

What is claimed is:

1. A fan containment structure comprising: an annular inner fan casing having a leading edge and a trailing edge with an inner annular surface therebetween, the inner annular surface being formed of an abradable material, the inner annular surface of the abradable material having a contour that has at least two different linear slopes in opposite directions located substantially in the forward two-thirds of the inner annular surface.

2. The fan containment structure of claim 1 wherein, the abradable material further comprises a contoured surface characterized by a substantially trapezoidal shape.

3. The fan containment structure of claim 1 further comprising, an outer fan casing attached to the inner fan casing, the outer fan casing being surrounded by a kevlar cover.

4. The fan containment structure of claim 1 wherein, the abradable material is bonded to the inner fan casing by an adhesive layer.

5. The fan containment structure of claim 4 wherein, inner fan casing includes an inner annular groove containing the abradable material.

6. A fan containment structure comprising: an annular inner fan casing with a leading edge, a trailing edge, and having an inner annular surface, the inner annular surface being formed of an abradable material, the inner annular surface of the abradable material having a contour that has at least two different linear slopes in opposite directions between the leading edge and the trailing edge wherein, the abradable material further comprises a contoured surface characterized by a substantially triangular shape.

7. The abradable fan containment structure of claim 6 wherein, the abradable material is bonded to the casing member by an adhesive layer.

8. An abradable fan containment structure within a fan section of a turbofan engine, the fan section of the turbofan engine having fan blades with blade tips and an abradable fan shroud, the abradable shroud assembly comprising: an inner fan casing including an abradable material, the abradable material having an inner annular surface that is substantially triangular in cross-section along the axial length, the inner fan casing circumscribing the fan blades and the inner annular surface being disposed adjacent to the blade tips of the fan blades within the fan section wherein, the abradable material further comprises a contoured surface characterized by a substantially trapezoidal shape during operation of the engine.

9. The fan containment structure of claim 1 wherein, the contour of the inner annular surface is characterized by a substantially triangular shape.

* * * * *